US005395263A

United States Patent [19]

Sandell

[11] Patent Number: 5,395,263
[45] Date of Patent: Mar. 7, 1995

[54] DUAL BATTERY HOLDER

[75] Inventor: Donald Sandell, San Jose, Calif.

[73] Assignee: C & K Systems, Inc., Folsom, Calif.

[21] Appl. No.: 36,145

[22] Filed: Mar. 24, 1993

[51] Int. Cl.⁶ .............................................. H01R 3/00
[52] U.S. Cl. ..................................... 439/500; 429/100
[58] Field of Search ............... 439/217, 218, 500, 627;
429/96–100, 121

[56] References Cited

U.S. PATENT DOCUMENTS

| 3,930,889 | 1/1976 | Ruggiero et al. | 429/97 |
| 4,737,420 | 4/1988 | Ikeda et al. | 439/627 X |
| 4,752,539 | 6/1988 | Vatter | 429/97 X |
| 5,038,093 | 8/1991 | Edwards et al. | 429/96 X |
| 5,211,579 | 5/1993 | Seong et al. | 439/100 X |
| 5,264,303 | 11/1993 | McCaffery | 429/100 X |

Primary Examiner—Khiem Nguyen
Attorney, Agent, or Firm—Ronald L. Yin

[57] ABSTRACT

A battery container is of a size to accommodate two "AA" batteries situated side by side, or one "transistor" size battery. The container has two independent electrical contacts located at one end to make electrical contacts with the terminals of the "transistor" battery or with one of the ends of both "AA" size batteries. A retainer is located at another end of the container. The retainer provides electrical contact with the other ends of both "AA" size batteries. In addition, the retainer exerts pressure in the length direction to accommodate the smaller length of the "AA" or the "transistor" battery and exerts pressure in the width direction to accommodate the smaller width of the two "AA" or the "transistor" battery.

3 Claims, 1 Drawing Sheet

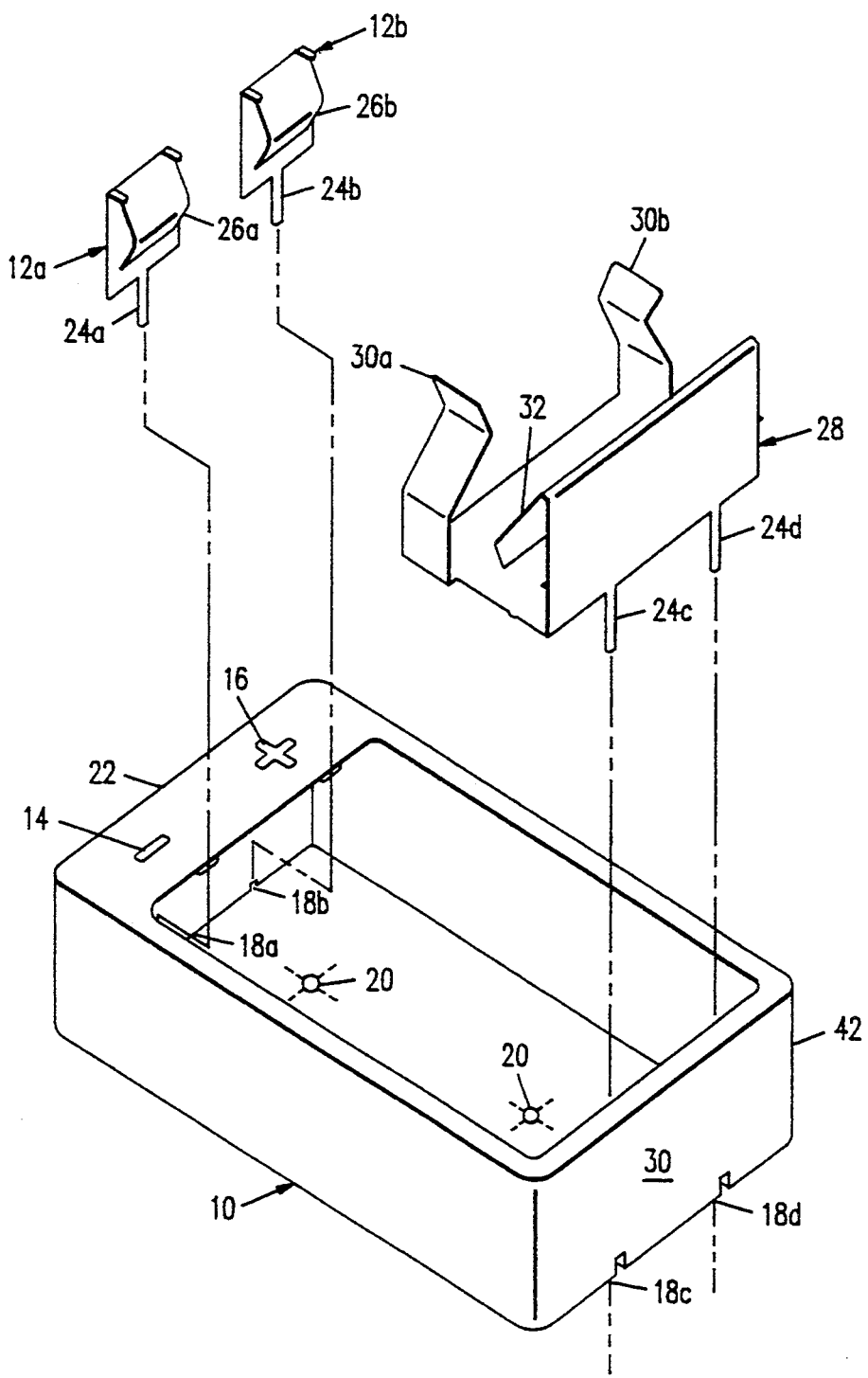

DUAL BATTERY HOLDER

BACKGROUND OF THE INVENTION

1. Field of the Invention

This invention relates to containers that hold and electrically connect to batteries, and in particular to containers that can alternately hold and electrically connect to two different sizes of batteries.

2. Background of the Invention

Many electrical devices use batteries for their power source. Two common types of batteries are the "AA" battery, with a total voltage of 1.6 volts each, and the nine volt "transistor" battery. These two battery types have different sizes, shapes and dimensions and different locations for their electrical terminals.

An "AA" battery is cylindrically shaped having two electrical terminals at opposite ends of its cylindrical body. Usually "AA" batteries are held in place by electrical contacts mounted in an insulated box which contact the electrical terminals at opposite ends of the cylindrical body. The contacts, as well as the insulated box, hold the battery in place. The electrical contacts make the electrical connection between the battery terminals and the device.

A "transistor" battery is a rectangularly shaped box having two electrical contacts located on the same end of the box. Each terminal has a snap having a different shape which is designed to mate with a snap of an opposite shape. The two snaps are usually contained in a single electrical connector. Additional means are necessary to hold the battery in place after the electrical connections are made.

There are electrical devices that have the versatility or the requirement to alternately utilize either 2 "AA" batteries or 1 "transistor" battery. For these devices to alternately use different types of batteries, two battery holders are currently necessary; one for the "AA" battery and its electrical connections, and one for the "transistor" battery and its electrical connections. Interchanging batteries can be necessary when different voltages are alternatively required, or for the versatility that either type of battery can alternately be used if the other type of battery is not available.

These two types of batteries, which have different sizes and different electrical connections, currently cannot alternatively be inserted into a single battery holder such that each type of battery is held in place and all electrical connections are properly made.

The prior art disclosed using a standard "AA" battery holder that holds 2 "AA" batteries and with an external electrical connector for a "transistor" battery which is fixed on the outside of one end of the holder. The "transistor" battery attaches to the outside of the "AA" battery holder, which requires additional space be provided next to the "AA" type holder to accommodate the additional space needed for the "transistor" battery.

Today's micro-electronic devices require all their elements, including the power source, to utilize a minimal amount of space. The prior art battery holder assembly, as disclosed hereinabove, is almost double the size of standard 2 "AA" battery holders. Because of the additional space requirements, this larger battery holder assembly cannot be substituted into existing equipment, and new equipment must supply double the space in order to utilize the versatility of alternating between the two different types of batteries.

For devices that can utilize either type of battery, there is a need for a single battery holder that can accommodate either 2 "AA" batteries or 1 "transistor" battery in the same compact box in which electrical connections are properly made when either type of battery is inserted into the battery holder. There also is a need to provide a means for securing either type of battery in place which is independent of, and supplemental to, any securing means accomplished using the battery terminals.

Another problem with the use of "transistor" batteries is that the single unitary electrical connector used with the "transistor" batteries damage easily and are difficult to use. These types of batteries may need frequent replacement. There is a need for a "transistor" battery holder that requires the user only to insert that battery in place, and such insertion makes all the necessary electrical connections as well as firmly secures the battery in the holder.

SUMMARY OF THE INVENTION

These problems have been overcome by the present invention. The present invention provides a battery holder that will securely hold two different type of batteries, such as either two "AA" batteries or one "transistor" battery, within the same compact box. The contacts of the battery holder not only secure each type of battery in place, but they also make the proper electrical connections to the electrical terminals of either type of battery upon insertion of the battery or batteries into the holder. Further, a securing means is utilized such that the holder will securely hold either type of battery that is placed in the battery holder.

BRIEF DESCRIPTION OF THE DRAWINGS

FIG. 1 is an exploded perspective view of the dual battery holder of the present invention.

DETAILED DESCRIPTION OF THE INVENTION

Referring to FIG. 1, there is shown a dual battery holder, designated in its entirety by the number 10. The dual battery holder 10 comprises an outer case 42 made of plastic or other insulating material which is slightly larger than two "AA" batteries situated side by side. The case 42 has holes 18(a–d) at either end to facilitate electrical connections to wires or PC boards located underneath the bottom side of case 42. The case 42 also has polarity indications 14 and 16 that provide for the desired orientation of the battery or batteries that are to be inserted. The preferred embodiment may include holes 20 for optional screws for securing case 42 to a PC board or other surface underneath the bottom side of the battery holder 10.

Two front snap-in contacts 12(a–b) are attached inside the front end 22 of the case 42 such that their respective end pins 24(a–b) protrude through respective holes 28(a–b) in the case 42 to make electrical contact with wires or PC boards located underneath the bottom side of case 42. The two front snap-in contacts 12(a–b) are fixed inside the case 42 such that the front surfaces 26(a–b) of the snap-in contact 12(a–b) make proper electrical connections with the terminals of either two "AA" batteries or 1 "transistor" battery that are inserted into case 42. The front surfaces 26(a–b) serve two purposes. First, the front surfaces 26(a–b) serve as an electrical contact that electrically connects the battery terminals to the pins 24(a-b). Secondly, the front surfaces 26(a-b) are flexible so as to provide some spring force against the battery terminals upon insertion of the battery or batteries into holder 10.

A rear snap-in retainer/terminal 28 is attached inside the rear end 30 of the case 42. The snap-in retainer/terminal 28 has two end pins 24(c-d) which protrude through respective holes 18(c-d) in the case 42 to make electrical contact with wires or PC boards located underneath the bottom side of case 42. The rear snap-in retainer/terminal 28 has a rear surface 32 which serves two purposes. First, the rear surface 32 provides a spring action force to ensure the terminals of either the "AA" batteries or the "transistor" battery make a proper good electrical connection with the front snap-in contacts 12(a-b). The spring action of the rear surface 32 is capable of compensating for the difference of battery lengths for standard "AA" batteries and a standard "transistor" battery. The distance between the rear surface 32 to the front surfaces 26(a-b) is less than the length of the smaller of the "AA" or "transistor" battery. Secondly, the rear surface 32 serves as an electrical contact for "AA" batteries such that the two terminals of the "AA" batteries that are at the rear end 30 of the battery holder are electrically connected with each other as well as electrically connected with the end pins 24(c-d).

The rear snap-in retainer/terminal 28 also has two side clips 30(a-b). The two side clips 30 secure either one "transistor" battery or two "AA" batteries in place by providing lateral and downward force to the battery or batteries that are placed in the battery holder 10. The distance between the two side clips 30(a-b) is less than the width of the smaller of two "AA" batteries, situated side by side, or one "transistor" battery.

The two front snap-in contacts 12(a-b) and the rear snap-in retainer/terminal 28 are also designed to snap and lock into place when they are inserted into box 12. This simplifies initial assembly of the battery holder 10. It also facilitate replacement of damaged contacts that may need replacing.

The preferred embodiment can be used in three ways. First, two "AA" batteries can be inserted side by side where the polarities at each end of the box 12 are opposite. This would supply a total charge of 3.2 volts between the two pins 24(a-b), with the batteries in series. Secondly, the two "AA" batteries can be inserted side by side with their polarities at each end being the same. That would supply a total voltage of 1.6 volts between pins 24(a-b) and pins 24(c-d) with the batteries in parallel. Thirdly, one "transistor" battery can be inserted where the total charge between the two pins 24(a-b) is 9 volts.

The advantages of this invention are that it provides the user the ability to use two different types of batteries in their electrical device using the same compact battery holder 10. This eliminates the need for two different battery holders when alternatively using different types of batteries. Further, it eliminates the need to utilize a standard "transistor" battery wire connector, which is difficult to use and can fail. The invention allows the user to insert one "transistor" battery or two "AA" batteries into the holder and the battery is securely held in place and all electrical connections are properly made.

Of course electronics (not shown) to which the contacts 24(a-d) are electrically connected must be able to differentiate the different voltage levels present, using different batteries.

What is claimed is:

1. A dual battery holder for holding two different types of batteries, each type of a different size and shape from the other, said holder comprising:
   a substantially rectangularly shaped container, made of a non-conductive material;
   said container having a length and a width, with said length of a dimension to accommodate the larger length of the two types and with said width of a dimension to accommodate the larger width of the two types;
   a plurality of electrical contacts in said container to make electrical contact with the two types of batteries, said contacts having means for exerting pressure in a direction along the length to accommodate the smaller length of the two types, and said contacts having means for exerting pressure in a direction along the width to accommodate the smaller width of the two types.

2. A dual battery holder for holding two different types of batteries alternatively, comprising:
   a box made of non-conductive material capable of containing two standard "AA" batteries side by side, each having two battery terminals or one standard nine volt "transistor" battery having two battery terminals;
   said box having a first electrical contacts at a one end of the box such that said first electrical contacts at said one end make electrical connections with one battery terminal on each of said two standard "AA" batteries positioned side by side inside said box or alternatively said first electrical contacts at said one end make electrical connections to said two terminals on said standard nine volt battery in said box and said box having a second electrical contact at other end opposite from said one end such that said second electrical contact makes electrical connections with the other terminals of both of said two standard "AA" batteries positioned side by side inside said box and for retaining said standard nine volt battery when positioned in said box.

3. A dual battery holder as recited in claim 2 wherein:
   said first electrical contacts at one end of the box are two independent electrical contacts wherein each one of them makes electrical contact with a different battery terminal at said one end of the box;
   said second contact at the other end of the box opposite said one end, having an electrical contact and means for exerting pressure on two "AA" batteries positioned in said box along the direction between said one end and said other end, and means for exerting pressure on a "transistor" battery positioned in said box along a direction substantially perpendicular between said one end and said other end.

* * * * *